United States Patent [19]
Ellis

[11] Patent Number: 5,121,847
[45] Date of Patent: Jun. 16, 1992

[54] CARBON RUPTURE DISK ELEMENT AND ASSEMBLY

[75] Inventor: Jim E. Ellis, York, Nebr.

[73] Assignee: BS&B Safety Systems, Inc., Tulsa, Okla.

[21] Appl. No.: 824,147

[22] Filed: Jan. 22, 1992

[51] Int. Cl.$^5$ .............................................. F16K 17/40
[52] U.S. Cl. ...................... 220/89.2; 220/89.1; 220/203; 220/207
[58] Field of Search ............. 220/89.2, 89.1, 203, 220/207, 281

[56] References Cited

U.S. PATENT DOCUMENTS

| | | | |
|---|---|---|---|
| 1,584,523 | 5/1926 | Egbert | 220/89.2 |
| 2,553,267 | 5/1951 | Nedoh | 220/89.2 |
| 2,922,544 | 1/1960 | Hibbard et al. | 220/89.2 |
| 2,952,383 | 9/1960 | Paxton et al. | 220/89 |
| 3,443,721 | 5/1969 | Lejeune | 220/89 |
| 3,537,605 | 11/1970 | Solowey | 220/89.2 X |
| 3,834,580 | 9/1974 | Ludwig et al. | 220/89.2 |
| 4,102,469 | 7/1978 | Shegrud et al. | 220/89 A |
| 4,139,005 | 2/1979 | Dickey | 138/89 |
| 4,315,575 | 2/1982 | Schwarz | 220/89 A |
| 4,434,905 | 3/1984 | Ou et al. | 220/89.2 |
| 4,479,587 | 10/1984 | Mundt et al. | 220/89.2 |
| 4,607,664 | 8/1986 | Carney et al. | 220/89.2 X |
| 5,002,085 | 3/1991 | Fitzgerald | 220/89.1 X |
| 5,012,945 | 5/1991 | Keenan | 220/89.1 |

FOREIGN PATENT DOCUMENTS 1138885 1/1969 United Kingdom .

Primary Examiner—Stephen Marcus
Assistant Examiner—Vanessa Caretto
Attorney, Agent, or Firm—Laney, Dougherty, Hessin & Beavers

[57] ABSTRACT

An improved replaceable carbon rupture disk element and element-holder assembly are provided. The carbon rupture disk element is comprised of a carbon disk having a pair of opposing bores extending thereinto whereby an integral blow-out portion having a particular rupture pressure is formed in the disk connected to an enlarged rim portion. A reinforcing ring is attached to the rim of the carbon disk having a height substantially equal to or greater than the height of the enlarged rim portion of the disk which prevents the rim portion from being subjected to compressive forces which change the rupture pressure of the blow-out portion.

20 Claims, 1 Drawing Sheet

CARBON RUPTURE DISK ELEMENT AND ASSEMBLY

BACKGROUND OF THE INVENTION

1. Field of the Invention

The present invention relates to a carbon rupture disk element and assembly, and more particularly, to an improved replaceable carbon rupture disk element and a holder-element assembly.

2. Description of the Prior Art

A great variety of rupture disks for preventing excessive fluid pressure in vessels or systems have been developed and used heretofore. The rupture disks function to relieve fluid pressure by rupturing when a predetermined pressure is exerted thereon, and they have been formed of various materials including metals, plastics and carbon, e.g., graphite and baked carbon.

Graphite rupture disks which have been impregnated with resins to make them gas tight have been found to be advantageous in that they are economical to produce, have excellent chemical corrosion resistance, do not creep and fatigue as a result of pressure variations and reliably fail at their predetermined rupture pressure regardless of temperature variations.

The carbon rupture disks utilized heretofore have generally been of two types. The first and most common is the monoblock type comprised of a carbon disk having a central bore machined therein which extends from one side of the disk towards the other side thereof. The depth of the bore is such that the carbon material remaining between the bottom of the bore and the other side of the disk is of a thickness and strength whereby it ruptures at a predetermined desired rupture pressure. The disk is of a large size so that it can be bolted directly between pipe flanges or the like, and when the predetermined rupture pressure is reached, the central portion of the disk between the bottom of the bore and the other side of the disk blows out and relieves pressure therethrough.

The second type of carbon rupture disk unit utilized heretofore is an improvement over the monoblock disk in that it includes a replaceable carbon element. That is, the unit is comprised of an assembly of a carbon rupture disk element positioned between annular holders formed of carbon or other material. The holder-rupture disk element unit is sealingly clamped between pipe flanges or the like whereby the rupture disk element is in turn sealingly clamped between the holders. Upon rupture, the rupture disk element can be replaced without replacing the holders.

While the above described heretofore utilized carbon rupture disks and assemblies have achieved varying degrees of success, they suffer from the disadvantages that they are sensitive to compressive forces and they are directional, i.e., they rupture at the predetermined rupture pressure in only one direction. More specifically, the rupture pressures of prior carbon rupture disks are changed when excessive compressive forces are exerted on the disks as a result of being clamped between holders and/or pipe flanges. That is, when a carbon rupture disk is subjected to compression forces to assure a pressurized fluid seal, stresses are introduced into the brittle carbon material which change the pressure at which the disk ruptures.

The directional rupture aspect of prior carbon rupture disks requires that such a disk be installed between holders and/or pipe flanges with a particular side of the disk facing the fluid pressure. If the rupture disk is inadvertently installed upside down, the fluid pressure at which the disk ruptures is changed which can bring about a premature rupture or a dangerous overpressure condition.

Thus, there is a need for an improved carbon rupture disk element and holder-element assembly whereby the carbon rupture disk element can be subjected to excessive compressive forces without changing the rupture pressure of the disk, and whereby the carbon rupture disk element can be installed with either side thereof facing the inlet fluid pressure without affecting the rupture pressure.

SUMMARY OF THE INVENTION

An improved replaceable carbon rupture disk element is provided which overcomes the shortcomings of the prior art and meets the needs recited above. The replaceable element is comprised of a carbon disk having opposite faces, a rim and a pair of opposing bores which extend through the faces and into the disk. Each of the bores has a depth less than half the distance between the faces whereby an integral blow-out portion having a particular rupture pressure is formed in the disk connected to an enlarged rim portion. A reinforcing ring is attached to the rim of the disk having a height substantially equal to or greater than the height of the rim portion of the disk whereby when the reinforcing ring and the disk are clamped between holders or flanges, the reinforcing ring prevents the rim portion of the disk from being subjected to compressive forces which change the rupture pressure of the blow-out portion.

The holder-element assembly of the invention comprises the replaceable carbon rupture disk element described above and a pair of annular rupture disk element holders adapted for the rupture disk element to be positioned and clamped therebetween. The holder-element assembly is adapted to be clamped between flanges such as bolted pipe flanges.

Because the carbon rupture disk element includes a pair of opposing bores which form the blow-out portion interiorly, therein, the rupture pressure of the blow-out portion is substantially the same regardless of which side of the disk fluid pressure is exerted on.

It is, therefore, a general object of the present invention to provide an improved carbon rupture disk element and assembly.

A further object of the present invention is the provision of an improved replaceable carbon rupture disk element which can be subjected to excessive compressive forces without altering the rupture pressure of the rupture disk, and which can be installed with either side facing the fluid pressure without affecting the rupture pressure.

Other and further objects, features and advantages of the present invention will be readily apparent to those skilled in the art upon a reading of the description of preferred embodiments which follows when taken in conjunction with the accompanying drawing.

DESCRIPTION OF PREFERRED EMBODIMENTS

Figure 1:
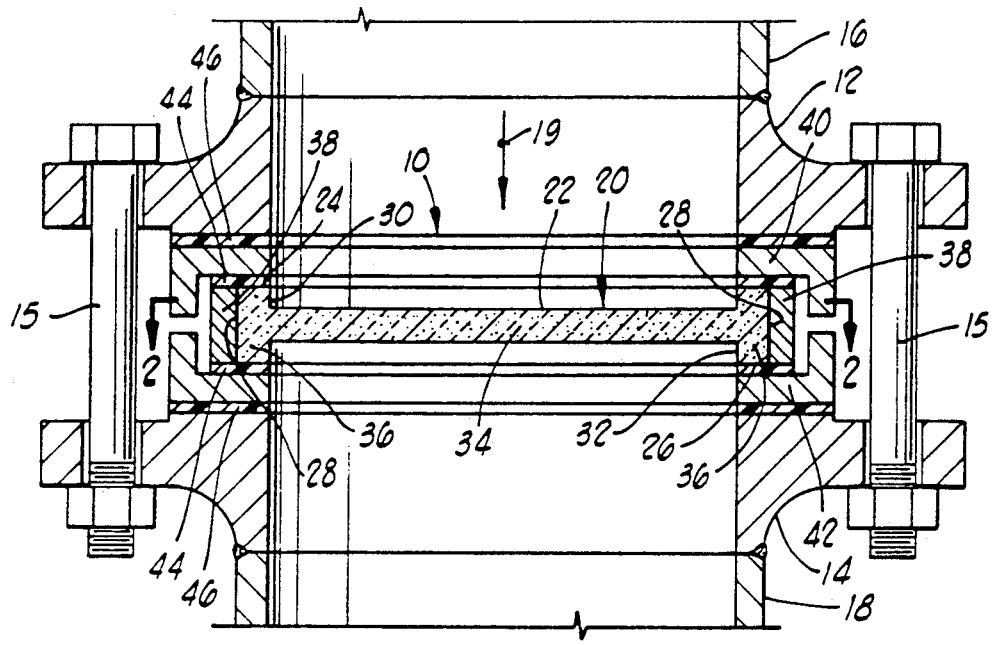
FIG. 1 is a side cross-sectional view of a pair of pipe flanges having the improved replaceable carbon rupture disk element and holder assembly of the present invention clamped therebetween.
Figure 2:
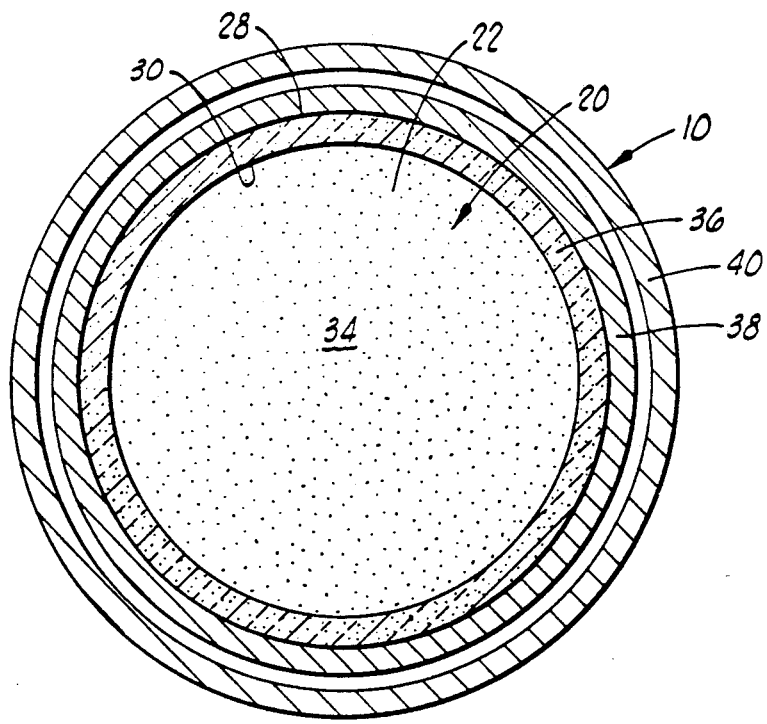
FIG. 2 is a cross-sectional view taken along line 2—2 of FIG. 1.

Referring now to the drawing, the improved replaceable carbon rupture disk element and holder assembly of the present invention, generally designated by the numeral 10, is illustrated clamped between a pair of pipe flanges 12 and 14. The pipe flanges 12 and 14 are sealingly clamped with the assembly 10 therebetween by means of a plurality of bolts 15. A conduit 16 is connected to the pipe flange 12, such as by welding, and to a vessel or system containing a fluid under pressure (not shown). The pressurized fluid from the vessel or system is communicated by way of the conduit 16 and pipe flange 12 to the rupture disk assembly 10 as shown by the arrow 19, and the force of the pressurized fluid is exerted on the side of the rupture disk assembly 10 facing the pipe flange 12. The pipe flange 14 is connected to a conduit 18 which leads pressurized fluid relieved through the assembly 10 to a containment vessel or other location.

The assembly 10 is comprised of a rupture disk element 20 which includes a carbon disk 22 having opposite faces 24 and 26 and a rim 28. A pair of opposing bores 30 and 32 extend through the faces 24 and 26 respectively into the disk 22. Each of the bores 30 and 32 have a depth less than half the distance between the faces 24 and 26 whereby an integral blow-out portion 34 having a particular rupture pressure is formed in the disk 22. The blow-out portion 34 is integrally connected to an enlarged annular rim portion 36.

The carbon disk 22 is preferably formed of graphite impregnated on both sides with a resinous or plastic filler that plugs the pores of the graphite and renders the disk impervious to gases. A particularly suitable resin for this purpose is high temperature epoxy resin. The disk 22 is also preferably circular in peripheral shape with the faces 24 and 26 thereof being substantially parallel. The opposing bores 30 and 32 are preferably cylindrical and substantially identical in diameter and depth whereby the blow-out portion 34 of the disk 22 has substantially the same rupture pressure regardless of which side of the disk fluid pressure is exerted on.

In order to prevent the carbon rupture disk 22 from being subjected to compressive forces which change the rupture pressure of the blow-out portion 34 when clamped between holders or flanges, the element 20 includes a reinforcing ring 38 attached to the rim 28 of the carbon disk 22. The reinforcing ring 38 is of a height substantially equal to or greater than the height of the rim portion 36 of the carbon disk 22 whereby compressive forces resulting from clamping the element 20 between holders or flanges are transmitted to and resisted by the reinforcing ring 38 rather than being transmitted to the enlarged portion 36 of the disk 22.

The reinforcing ring 38 is preferably bonded to the rim 28 of the disk 22 using a suitable adhesive, and the reinforcing ring 38 is formed of a material having the rigidity required to resist deformation as a result of compressive forces exerted on it. Generally, the reinforcing ring 38 can be formed of metals or plastics, with metals being preferred and stainless steel being particularly preferred.

As will be understood by those skilled in the art, the replaceable rupture disk element 20 can be clamped directly between the pipe flanges 12 and 14 with or without conventional gaskets therebetween. In a more preferred assembly, the rupture disk element 20 is clamped between a pair of annular holders 40 and 42. The annular holders 40 and 42 can take various cross-sectional shapes, but the L-shape illustrated in the drawing is presently preferred. Conventional gaskets 44 can be disposed between the holders 40 and 42 and the rupture disk element 20, and conventional gaskets 46 can be disposed between the holders 40 and 42 and the pipe flanges 12 and 14, respectively. The holders 40 and 42 can be formed of a variety of materials including carbon, metals or plastics. The selection of a particular holder material depends on the particular application in which the assembly 10 is utilized and other factors In relatively low pressure applications and/or where economy is a factor, holders formed of graphite are preferred. In other higher pressure applications, stainless steel is generally preferred.

The holder-rupture disk element assembly 10 can be assembled in any convenient sequence whereby the rupture disk element 20 is positioned between the holders 40 and 42 as illustrated in FIGURE with the gaskets 44 (if used) positioned between the enlarged rim portion 36 of the carbon rupture disk 22 and the ends of the annular reinforcing ring 38. The carbon rupture disk element 20 can be installed with either side facing the pressurized fluid without affecting the rupture pressure of the blow-out portion 34 thereof as described above. The holder-element assembly 10 is then installed between the pipe flanges 12 and 14 with the gaskets 46 (if used) positioned between the holders 40 and 42 and the flanges 12 and 14, respectively. The pipe flanges 12 and 14 are sealingly clamped against the holder-element assembly 10 by the bolts 15 which in turn causes the holders 40 and 42 to be sealingly clamped against the rupture disk element 20.

When the pressure exerted on the blow-out portion 34 of the carbon rupture disk 22 of the element 20 reaches the rupture pressure thereof, i.e., the predetermined pressure at which the blow-out portion ruptures, the blow-out portion 34 fails and pressurized fluid from the vessel or system being protected flows through the assembly 10 and pipe flanges 12 and 14 to a containment vessel or other location.

Thus, the improved replaceable carbon rupture disk element of this invention is non-directional and is unaffected by excessive compressive forces exerted on it due to over torquing the bolts of the flanges or other members between which it is clamped. While numerous changes in the construction and arrangement of parts of the rupture disk element or holders-element assembly of this invention may suggest themselves to those skilled in the art, such changes are encompassed within the spirit of this invention as defined by the appended claims.

What is claimed is:

1. An improved replaceable carbon rupture disk element comprising:
   a carbon disk having opposite faces, a rim and a pair of opposing bores extending through said faces and into said disk, each of said bores having a depth less than half the distance between said faces whereby an integral blow-out portion having a particular rupture pressure is formed in said disk connected to an enlarged rim portion; and
   a reinforcing ring attached to said rim of said disk and being of a height substantially equal to or greater than the height of said rim portion whereby when said reinforcing ring and said disk are clamped between holders or flanges, said reinforcing ring prevents said rim portion of said disk from being subjected to compressive forces which change said rupture pressure of said blow-out portion.

2. The rupture disk element of claim 1 wherein said carbon disk rim and said reinforcing ring are substantially circular.

3. The rupture disk element of claim 1 wherein said opposite faces of said carbon disk are substantially parallel.

4. The rupture disk element of claim 3 wherein said opposing bores in said carbon disk are substantially cylindrical.

5. The rupture disk element of claim 3 wherein said opposing bores in said carbon disk are substantially identical in shape and depth whereby said blow-out portion of said disk has substantially the same rupture pressure regardless of which side of said disk said pressure is exerted on.

6. The rupture disk element of claim 1 wherein said carbon disk is formed of graphite.

7. The rupture disk element of claim 1 wherein said reinforcing ring is formed of a material selected from the group consisting of metals and plastics.

8. An improved replaceable carbon rupture disk element comprising:

a carbon disk having opposite parallel faces, a circular rim and a pair of opposing cylindrical bores extending through said faces and into said disk, each of said bores having a depth less than half the distance between said faces whereby an integral circular blow-out portion having a particular rupture pressure is formed in said disk connected to an enlarged rim portion; and a reinforcing ring attached to said rim of said disk and being of a height substantially equal to or greater than the height of said rim portion whereby when said reinforcing ring and said disk are clamped between holders or flanges, said reinforcing ring prevents said rim portion of said disk from being subjected to compressive forces which change said rupture pressure of said blow-out portion.

9. The rupture disk element of claim 8 wherein said opposing bores in said carbon disk are substantially identical in peripheral shape and depth whereby said blow-out portion of said disk has substantially the same rupture pressure regardless of which side of said disk said pressure is exerted on.

10. The rupture disk element of claim 9 wherein said carbon disk is formed of graphite.

11. The rupture disk element of claim 10 wherein said reinforcing ring is formed of stainless steel.

12. An improved carbon rupture disk assembly comprising:

a replaceable carbon rupture disk element comprised of:

a carbon disk having opposite faces, a rim and a pair of opposing bores extending through said faces and into said disk, each of said bores having a depth less than half the distance between said faces whereby an integral blow-out portion having a particular rupture pressure is formed in said disk connected to an enlarged rim portion, and a reinforcing ring attached to said rim of said disk and being of a height substantially equal to or greater than the height of said rim portion whereby when said reinforcing ring and said disk are clamped between holders, said reinforcing ring prevents said rim portion of said disk from being subjected to compressive forces which change said rupture pressure of said blow-out portion; and a pair of annular holders adapted for sealingly clamping said rupture disk element therebetween.

13. The carbon rupture disk assembly of claim 12 wherein said carbon disk rim and said reinforcing ring are substantially circular.

14. The carbon rupture disk assembly of claim 12 wherein said opposing faces of said carbon disk are substantially parallel.

15. The carbon rupture disk assembly of claim 14 wherein said opposing bores in said carbon disk are substantially cylindrical.

16. The carbon rupture disk assembly of claim 14 wherein said opposing bores in said carbon disk are substantially identical in shape and depth whereby said blow-out portion of said disk has substantially the same rupture pressure regardless of which side of said disk said pressure is exerted on.

17. The carbon rupture disk assembly of claim 12 wherein said carbon disk is formed of graphite.

18. The carbon rupture disk assembly of claim 17 wherein said reinforcing ring is formed of a material selected from the group consisting of metals and plastics.

19. The carbon rupture disk assembly of claim 18 wherein said holders are formed of a material selected from the group consisting of carbon, metals and plastics.

20. The carbon rupture disk assembly of claim 12 wherein said holders are adapted to be clamped between a pair of pipe flanges.

* * * * *